(12) United States Patent
Chan et al.

(10) Patent No.: US 6,403,084 B1
(45) Date of Patent: Jun. 11, 2002

(54) MIXED CULTURES FOR IMPROVED FERMENTATION AND AEROBIC STABILITY OF SILAGE

(75) Inventors: Russell Kuo-fu Chan; Scott Dennis, both of Urbandale; Elizabeth K. Harman, Alleman; William Rutherford, Des Moines; Brenda Smiley, Granger, all of IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

(21) Appl. No.: 09/706,001

(22) Filed: Nov. 3, 2000

(51) Int. Cl.[7] .................................................. A01N 63/00
(52) U.S. Cl. ............................... 424/93.45; 424/93.48; 426/52; 426/53; 426/56; 426/332; 426/335; 426/532; 435/42; 435/139; 435/252.9; 435/253; 435/857
(58) Field of Search .................... 424/93.45, 93.48; 426/52, 53, 56, 332, 335, 532; 435/42, 139, 252.9, 253, 857

(56) References Cited

U.S. PATENT DOCUMENTS 5,371,011 A * 12/1994 Bernier et al. ........... 435/252.4
5,747,020 A * 5/1998 Rutherford et al. ...... 424/93.45

FOREIGN PATENT DOCUMENTS

GB 2310124 A * 8/1997

OTHER PUBLICATIONS

Gibson et al., *J. Gen. Micro.* (1958), 19:112–129.
Grazia and Suzzi *J. Appl. Bacteriol.* (1984) 56: 373–379.
Langston et al., *USDA Technical Bulletin* No. 1187 (1958).
Nilson, *Arch. Microbiol.* (1956), 24:396–411.
Szigeti, *Acta Almentaria* (1979) 8: 25–40.

* cited by examiner

*Primary Examiner*—Leon B. Lankford, Jr.
*Assistant Examiner*—Kailash C. Srivastava
(74) *Attorney, Agent, or Firm*—David B. Ran, Esq.; Gwynedd Warren; Quine Intellectual Property Law Group, P.C.

(57) ABSTRACT

Methods and compositions for treatment of animal feed or silage by treatment with a mixed culture of heterofermentive lactic acid bacteria and homofermentive lactic acid bacteria of the proper ratio. Bacterial strains for such treatment are also provided.

25 Claims, No Drawings

MIXED CULTURES FOR IMPROVED FERMENTATION AND AEROBIC STABILITY OF SILAGE

TECHNICAL FIELD

This invention relates generally to the silage process and to microorganisms and use of the same in treating animal feed and silage to enhance aerobic stability of the same.

BACKGROUND OF THE INVENTION

The ensiling process is a method of moist forage preservation and is used all over the world. Silage accounts for more than 200 million tons of dry matter stored annually in Western Europe and the United States alone. The concept involves natural fermentation, where lactic acid bacteria ferment water soluble carbohydrates to form organic acids under anaerobic conditions. This causes a decrease in pH, which then inhibits detrimental microbes so that the moist forage is preserved. The process can be characterized by four different phases.

Upon sealing in the storage unit, the first phase is aerobic, when oxygen is still present between plant particles and the pH is 6.0 to 6.5. These conditions allow for continued plant respiration, protease activity and activity of aerobic and facultative aerobic microorganisms.

The second phase is fermentation, which lasts several days to several weeks after the silage becomes anaerobic. Lactic acid bacteria grow and become the primary microbial population thereby producing lactic and other organic acids, decreasing the pH to 3.8 to 5.0.

The third phase is stable with few changes occurring in the characteristics of the forage so long as air is prevented from entering the storage unit.

The final phase is feedout when the silage is ultimately unloaded and exposed to air. This results in reactivation of aerobic microorganisms, primarily yeast, molds, bacilli and acetic acid bacteria which can cause spoilage.

Aerobic instability is the primary problem in silage production. Even before storage units are open for feedout, silage can be exposed to oxygen because of management problems (i.e., poor packing or sealing). Under these types of aerobic conditions, rapid growth of yeast and mold cause silage to and spoil, decreasing its nutritional value.

Aerobic instability can be a problem even in inoculated silage that has undergone what would traditionally be considered a "good" fermentation phase, namely a rapid pH drop, and a low terminal pH. The yeast which contribute to instability in these conditions may be those which are tolerant of acid conditions and can metabolize the lactic acid produced by lactic acid bacteria during fermentation.

Management techniques that can be used to help prevent this condition involve using care to pack the silage well during the ensiling process and, also, using care in removing silage for feeding to minimize the aeration of the remaining silage.

The susceptibility of silage to aerobic deterioration is determined by physical, chemical, and microbiological factors. Management (compaction, unloading rates) largely effects the movement of oxygen into silage. During feedout, air can penetrate 1 to 2 m behind the silage face so that exposure to oxygen is prolonged. Fermentation acids and pH inhibit the rate of microbial growth but spoilage rates are affected also by microbial numbers and the rate of aerobic microbial growth on available substrates.

It is possible to use both chemical and biological additives in making silage to promote adequate fermentation patterns especially under sub-optimal conditions. Biological additives comprise bacterial inoculants and enzymes. Bacterial inoculants have advantages over chemical additives because they are safe, easy to use, non-corrosive to farm machinery, they do not pollute the environment and are regarded as natural products.

Lactic acid bacteria (LAB) are present as part of the normal microflora on growing plants. LAB can be classified as one of two types depending upon their primary metabolic end products; homofermentative which produce only lactic acid from the metabolism of glucose and hetrofermentative which produce lactic acid, ethanol, acetate and $CO_2$. The occurrences of these types are quite variable in both type and number, crop to crop and location to location. There appears to be some dependence upon the environmental conditions but in general it appears that the ensiling process is dominated by homfermentative LAB.

Nilson (*Arch Microbiol*. (1956) 24: 396-411) found that the predominant LAB in silage are Streprococci and Lactobacilli with *L. plantarum* being the most frequent species. Gibson et al, *J. Gen. Micro*. (1958) 19: 112-129) reported that *L. plantarum* and *L. acidophilis* were the dominant component of the homofermentative flora. Beck (*Landwirtschaftliche Forschung*. (1972) 27: 55-63) showed that even in grass silage where the epiphyte population was dominated by heterofermentative LAB, by day four of the ensiling process 85% of the organisms were homofermentative. Langston et al. (USDA *Technical Bullitin* No. 1187 (1958)) has shown that the 69% of the isolates in mature silage were homofermentative. A shift is sometimes noted toward homofermentative LAB in mature silage owing to their own tolerance to low pH and high acetate concentrations. Szigeti (*Acta Almentaria*. (1979) 8:25-40) found that the LAB flora at extremely low pH consisted mainly of *L. plantarum* and *L. brevis*. Grazia and Suzzi (*J. Appl. Bacteriol*. (1984) 56: 373-379) have shown that a strong sensitivity to pH 3.6 was observed among the herofermentative LAB. The lack of pH tolerance coupled with the predominance of homofermentative LAB early in ensiling would suggest against inoculation of silage with a combination of homofermentative and homofermentative LAB.

The ensiling process is a complex one and involves interactions of numerous different chemical and microbiological processes. Further, different silages and different methods of ensiling present a variety of different needs. As can be seen a need exists in the art for further improvement in compositions and methods to improve the aerobic stability of silage. The present invention provides novel strains of *L. buchneri* and superior combinations of homofermenters and heterofermenters for use as silage inoculants.

SUMMARY OF THE INVENTION

The present invention provides surprisingly effective, isolated and purified combinations of the homofermentive lactic acid bacteria *L. plantarnu* with the heterofermentive lactic acid bacteria *L. buchneri* or *L. brevis* for use as silage inoculants. The silage inoculants provided herein provide sufficiently low pH to assure adequate preservation of ensiled forage while retaining the aerobic stability enhancement imparted by the heterofermentive bacteria. The silage inoculant has a ratio of viable homofermentive bacteria to heterofermentive bacteria of about 1:5 to about 1:15. In optional embodiments the preferred ratio is 1:10. In additional embodiments *L. buchneri*, such as strains LN1391, LN4637, or LN4750, is provided. In some embodiments the silage inoculant will comprise a viable culture of *Enterococcus faecium*.

The present invention also provides methods of treating animal feed or silage with the silage inoculant of the present invention, as well as the treated animal feed or silage itself. Often, the animal feed or silage will be whole plant corn silage (WPCS) or high moisture corn (HWC). The present invention also provides a method of improving animal performance by feeding the inoculated animal feed or silage. Containers comprising the silage inoculant of the present invention and a carrier are also provided.

Definitions

Units, prefixes, and symbols may be denoted in their SI accepted form. Numeric ranges recited within the specification are inclusive of the numbers defining the range and include each integer within the defined range.

As used herein, "functional mutant" means a bacterial strain directly or indirectly obtained by genetic modification of, or using, the referenced strain(s) and retaning at least 50% of the activity of a control silage using the referenced strain. The genetic modification can be achieved through any means, such as but not limited to, chemical mutagens, ionizing radiation, transposon based mutagenesis, or via conjugation, transduction, or transformation using the referenced strains as either the recipient or donor of genetic material.

As used herein, "isolated" means removed from a natural source such as from uninoculated silage or other plant material.

As used herein, "purified" means that a bacterial species or strain is substantially separated from, and enriched relative to: yeasts, molds, and/or other bacterial species or strains found in the source from which it was isolated.

As used herein, "animal performance" means the yield of meat, milk, eggs, offspring, or work.

DETAILED DESCRIPTION OF THE INVENTION

In the present invention, specific bacterial species are combined in the proper ratio to provide both an adequate fermentation of silage or animal feed as well as an enhanced aerobic stability upon exposure of the silage or feed to air. The silage inoculant is an isolated and purified combination of at least one viable strain of the homofermentive lactic acid bacteria *Lactobacillus plantarum* and at least one viable strain of the heterofermentive lactic acid bacteria *Lactobacillus buchneri* or *Lactobacillus brevis*. In some embodiments, the silage inoculant will comprise at least 2 to 10 strains of homofermenter and/or heterofermenter. Exemplary strains of *L. plantarum* include at least one of LP286, LP287, LP329, LP346, LP347, or functional mutants thereof. Exemplary strains of *L. buchneri* include LN1391, LN4637, LN4750, or functional mutants thereof. The silage inoculant optionally comprises at least one viable strain of *Enterococcus faecium*, such as but not limited to, strains EF301, EF202, or functional mutants thereof. The number of viable homofermentive bacteria and heterofermentive bacteria in the inoculant are present in a ratio of from about 1:5 to about 1:15. In some embodiments the ratio is about: 1:6 to 1:14, 1:7 to 1:13, 1:8 to 1:12, 1:9 to 1:11, or 1:10.

The compositions which are used in the method of the invention may be in either liquid or dry form and may contain additional bacterial strains. In solid treatment forms, the composition may comprise the mixed bacterial culture together with a carrier. The carrier may be in the nature of an aqueous or nonaqueous liquid or a solid. In solid forms, the composition may contain solid carriers or physical extenders. Examples of such solid carriers, solid diluents or physical extenders include malto-dextrin, starches, calcium carbonate, cellulose, whey, ground corn cobs, and silicon dioxide. In short, the carrier may be organic or an inorganic physical extender. The solid composition can be applied directly to the forage in the form of a light powder dusting, or if it is disbursed in a liquid carrier it can successfully be sprayed on the forage.

Typical application rates for treating animal feed or silage according to this invention is about $10^4$ to $10^6$ viable homofermentive organisms/gm, preferably about $10^5$ to $10^6$ viable homofermentive organisms/gm.

Those of ordinary skill in the art will know of other suitable carriers and dosage forms, or will be able to ascertain such, using routine experimentation. Further, the administration of the various compositions can be carried out using standard techniques common to those of ordinary skill in the art.

Materials that are suitable for ensiling or storage, according to the methods of the invention, are any which are susceptible to aerobic spoilage. The material will usually contain at least 25% by weight dry matter. Such materials include rye or traditional grass, maize, including high moisture corn (HMC), whole plant corn (WPC), lucerne, wheat, legumes, sorghum, sunflower, barley or other whole crop cereals. The silage may be in bales (a form particularly susceptible to aerobic spoilage), oxygen limiting bags, bunkers, upright stave silos, oxygen limiting silos, bags, piles or any other form of storage which may be susceptible to aerobic spoilage. Alternatively, the invention may be used with any susceptible animal feed, whether solid or liquid, e.g. for pigs, poultry or ruminants.

Deposits

A deposit of the following microorganisms has been made with the American Type Culture Collection (ATCC), Rockville, Md., 20852: LP286 (ATCC Accession No. 53187), LP287 (ATCC Accession No. 55058), LP329 (ATCC Accession No. 55942), LP346 (ATCC Accession No. 55943), LP347 (ATCC Accession No. 55944), EF301 (ATCC Accession No. (55593), EF202 (ATCC Accession No. 53519), LN1391 (ATCC Accession No. PTA-2493), LN4637 (ATCC Accession No. PTA-2494), LN4750 (ATCC Accession No. PTA-2495). Deposit dates are as follows: LN 1391, LN 4637, and LN 4750 on Sep. 21, 2000, LP286 on May 11, 1985; LP287 on Jun. 5, 1990; LP329, LP346, and LP347 on Mar. 5, 1997; EF301 on Jun. 21, 1994, and EF202 on Jul. 23, 1986. The microorganisms deposited with the ATCC were taken from the same deposit maintained at Pioneer Hi-Bred International, Inc (Des Moines, Iowa.). Applicant(s) will meet all the requirements of 37 C.F.R. §1.801–1.809, including providing an indication of the viability of the sample when the deposit is made. These deposits will be maintained without restriction in the ATCC Depository, which is a public depository, for a period of 30 years, or 5 years after the most recent request, or for the enforceable life of the patent, whichever is longer, and will be replaced if it ever becomes nonviable during that period.

Although the present invention has been described in some detail by way of illustration and example for purposes of clarity of understanding, it will be obvious that certain changes and modifications may be practiced within the scope of the appended claims.

EXAMPLE 1

The objective of these studies was to test the efficacy of three *L. buchneri* isolates and a *L. brevis* isolate (heterofermenters) in combination with different homofermentative inoculants in an attempt to improve the aerobic stability of the base product without altering the fermentation and animal performance efficacy of the base homofermentative inoculant (Table 1). The results presented suggest that it is possible to improve the aerobic stability of a homofermentative base product by the addition of selected strains of *L. buchneri*.

Harvest

High moisture corn was harvested by combine at 22 to 28% moisture. Harvested grain was processed with a roller mill with rollers set at a gap width of approximately 3 mm.

Inoculation

Inoculants were formulated to deliver the appropriate rate as give in Table 2. A 30 cc syringe fitted with a 16-gauge needle was used to apply the inoculants to the forage at a rate of 1 ml/lb. The inoculants were mixed with the forage by rolling on clean plastic.

For each treatment two 4"×14" PVC silos with air infusion holes near the top and bottom of the silo were filled with 2.5 kg of forage. Experimental silos were fitted with rubber quick caps at each end, the top having a bunsen valve to allow gas to escape. The silos were then kept in an environmentally controlled room until opening.

Analyses

Two pre-ensiled forage samples were taken while filling during each trial for pH and microbial analysis. Lactic acid bacteria (LAB) were enumerated on modified DeMann-Rogosa-Sharpe (MRS) agar and yeasts and molds on Sabouraud Dextrose agar. Dry matter (DM) was determined by drying to a constant weight for 72 hours at 55° C. in a forced air oven. Inoculum was plated on modified MRS agar. Silos were opened after approximately 60 days, emptied and mixed. Samples were taken for pH, DM, digestibility, and aerobic stability analyses.

Aerobic stabilty was determined by placing 500 g of silage into a plastic tub with holes in the lid and bottom, placing a temperature probe in the center of the silage mass and placing the tub into a styrofoam cooler (Honig, Das Wirtschaftseigene Futter (1975) 21:25-32). The coolers were then kept in a temperature-controlled room where the ambient temperature and silage temperature were recorded by a datalogger every three hours for one week. DM was determined as per the pre-ensiled samples. Dried samples from the DM determination were ground through a 4 mm Wiley Mill screen and scanned by near infrared spectroscopy (NIRS).

TABLE 2

1999 HMC Field Test Prototype Treatments

| Treatment | Dose |
| --- | --- |
| Control | |
| A | 1 × 10⁴ CFU/g |
| Propionic acid | 5000 ppm |
| FE | 1 × 10⁴ CFU/g |
| A + | 1 × 10⁴ CFU/g |
| C21 | 1 × 10⁵ CFU/g |
| F + | 1 × 10⁴ CFU/g |
| C21 | 1 × 10⁵ CFU/g |
| FE + | 1 × 10⁴ CFU/g |
| C21 | 1 × 10⁵ CFU/g |
| A + | 1 × 10⁴ CFU/g |
| LN1391 | 1 × 10⁵ CFU/g |
| A + | 1 × 10⁴ CFU/g |
| LN4637 | 1 × 10⁵ CFU/g |
| A + | 1 × 10⁴ CFU/g |
| LN4750 | 1 × 10⁵ CFU/g |
| FE + | 1 × 10⁴ CFU/g |
| LN1391 | 1 × 10⁵ CFU/g |
| FE + | 1 × 10⁴ CFU/g |
| LN4637 | 1 × 10⁵ CFU/g |
| FE + | 1 × 10⁴ CFU/g |
| LN4750 | 1 × 10⁵ CFU/g |

Results and Discussion

As has been observed in many field trials with HMC, the homofermentative inoculants A and FE were ineffective in the improvement of aerobic stability. Propionic at a dose of 5000 ppm improved the aerobic stability by 94 hr when compared to uninoculated control and was effective in all trials (table 3).

TABLE 3

Treatment Consistency of HMC Field Trial Combination Prototypes

| Treatment | Win[1] | Loss[2] | No Difference |
| --- | --- | --- | --- |
| A | 0 | 1 | 7 |
| PROP | 8 | 0 | 0 |
| FE | 2 | 0 | 6 |
| F + C21 | 2 | 0 | 6 |
| FE + C21 | 4 | 0 | 4 |

TABLE 1

| Strain/Prototype ID | Identification | Original criterion for selection |
| --- | --- | --- |
| A | HMC inoculant *Lactobacillus plantarum* LP286, LP287, LP329); *Enterococcus faceium* (SF202, SF301) | Animal performance/aerobic stability improvements |
| F | *Lactobacillus plantarum* (LP286) | Fermentation enhancement |
| E | *Lactobacillus plantarum* (LP329) | Possible animal performance enhancement |
| C21 | *Lactobacillus brevis* (LB0505) | Heterofermentor, may improve aerobic stability |
| LN1391 | *Lactobacillus buchneri* | Heterofermentor, may improve aerobic stability |
| LN4637 | *Lactobacillus buchneri* | Heterofermentor, may improve aerobic stability |
| LN4750 | *Lactobacillus buchneri* | Heterofermentor, may improve aerobic stability |

TABLE 3-continued

Treatment Consistency of HMC
Field Trial Combination Prototypes

| Treatment | Win[1] | Loss[2] | No Difference |
|---|---|---|---|
| A + C21 | 5 | 0 | 3 |
| A + LN1391 | 8 | 0 | 0 |
| A + LN4637 | 5 | 0 | 3 |
| A + LN4750 | 7 | 0 | 1 |
| FE + LN1391 | 6 | 0 | 2 |
| FE + LN4637 | 8 | 0 | 0 |
| FE + LN4750 | 6 | 0 | 2 |

[1] 24 hour increase in stability compared to control
[2] 24 hour decrease in stability compared to control Combination of A or FE with *L. brevis*, C21, improved the aerobic stability by 34 and 41 hr, respectively but were only effective in 50–60% of the trials conducted. Little effect was observed when F was combined with C21. The terminal pH of these treated silages was sufficiently low to assure adequate preservation during anaerobic storage.

When A or FE were combined with the selected *L. buchneri* strains the aerobic stability of the base product was considerably enhanced. Stability increases ranged from 35 hr by the combination FE+LN4750 to 63 hr with the combination of A+LN1391. The consistency range from 63% of the trial to 100% efficacy after treatment with A+LN1391 and FE+LN4637. The terminal pH values for all treatments suggest adequate fermentation to effectively preserve the ensiled grain.

EXAMPLE 2

The objective of these trials was to test the efficacy of three *L. buchneri* isolates and a *L. brevis* isolate (heterofermentors) in combination with different homofermentative combinations in an attempt to improve aerobic stability of the base homofermentative inoculant without altering the fermentation and animal performance efficacy of the base homofermentative inoculant (Table 4) These data suggest that the combination of C with *L. buchneri* is effective in improving aerobic stability of whole plant corn silage. The terminal pH values and volatile fatty acids (VFA) profiles suggest that fermentation was only slightly different from the base product alone and adequate for good preservation during the anaerobic phase.

Previous field-testing has suggested that the *L. buchneri* strain LN6071 does not improve aerobic stability when combined with homofermentative inoculants. Selections were conducted to obtain additional *L. buchneri* strains, which are compatible with the fermentation patterns observed with the standard homofermentative inoculants while retaining the ability to improve aerobic stability.

Several strains were selected and tested in the greenhouse model for their compatibility with the base inoculants and efficacy in improving aerobic stability. Additional trial were performed in the greenhouse to determine the proper dose of the homofermentative inoculants with the *L. buchneri* strains. The three strains tested are a result of the greenhouse screening conducted during spring and summer 1999.

Harvest

Whole plant corn forage was harvested at approximately 2/3 milk line with a 2-row pull type forage chopper. Theoretical chop length was 9.5 to 13 cm.

Inoculation

Inoculants were formulated to deliver the appropriate rate as given in Table 5. A 30 cc syringe fitted with a 16-gauge needle was used to apply the inoculants to the forage at a rate of 1 ml/lb. The inoculants were mixed with the forage by rolling on clean plastic.

For each treatment two 4"×14" PVC silos with air infusion holes near the top and bottom of the silo were filed with 1123 g, 1173 g, 1271 g, 1144 g, 1459 g, 1278 g, 1207 g and 1097 g of forage. Experimental silos were fitted with rubber quick caps at each end, the top having a bunsen valve to allow gas to escape. The silos were then weighed for dry matter recovery. After filing, the silos were kept in an environmentally controlled room until opening and air infused for 24 hours on day 28.

Analyses

Three pre-ensiled forage samples were taken while filling during each trial for pH and microbial analysis. Lactic acid bacteria (LAB) were enumerated on modified MRS agar and yeasts and molds on Sabouraud Dextrose agar. Dry matter was determined by drying to a constant weight for 72 hours at 55° C. in a forced air oven. Inoculum was plated on modified MRS agar. Silos were opened after 50 days emptied and mixed. Samples were taken for pH, DM and aerobic stability analyses.

Aerobic stability was determined by placing 100 g of dry matter of silage into a plastic tub with holes in the lid and bottom, placing a temperature probe in the center of the silage mass and placing the tub into a styrofoam cooler (Honig, Das Wirtschaftseigene Futter (1975) 21:25–32). The coolers were then kept in a temperature-controlled room where the ambient temperature and silage temperature were recorded by a datalogger every three hours for one week. DM was determined as per the pre-ensiled samples. Frozen samples of selected samples were submitted for VFA analysis according to standard protocols.

TABLE 4

WPCS Field Test Prototype Strains

| Strain/ Prototype | Identification | Original criterion for selection |
|---|---|---|
| B | WPCS inoculant | Animal performance enhancements |
| C | Prototype WPCS inoculant (European origin) | Animal performance, anti-yeast and mold |
| F | *Lactobacillus plantarium* (LP286) | Fermentation enhancement |
| E | *Lactobacillus plantarium* (LP329) | Possible animal performance enhancement |
| C21 | *Lactobacillus brevis* (LB0505) | Heterofermentor, may improve aerobic stability |
| LN1391 | *Lactobacillus buchneri* | Heterofermentor, may improve aerobic stability |
| LN4637 | *Lactobacillus buchneri* | Heterofermentor, may improve aerobic stability |
| LN4750 | *Lactobacillus buchneri* | Heterofermentor, may improve aerobic stability |

TABLE 5

WPCS Field Test Prototype Treatments

| Treatment | Dose |
|---|---|
| Control | |
| B | $1 \times 10^5$ CFU/g |
| C | $1 \times 10^5$ CFU/g |
| Propionic acid | 5000 ppm |
| B + | $5 \times 10^4$ CFU/g |
| C21 | $5 \times 10^5$ CFU/g |

TABLE 5-continued

WPCS Field Test Prototype Treatments

| Treatment | Dose |
|---|---|
| F + | $5 \times 10^4$ CFU/g |
| C21 | $5 \times 10^5$ CFU/g |
| FE + | $5 \times 10^4$ CFU/g |
| C21 | $5 \times 10^5$ CFU/g |
| C + | $5 \times 10^4$ CFU/g |
| LN1391 | $5 \times 10^5$ CFU/g |
| C + | $5 \times 10^4$ CFU/g |
| LN4637 | $5 \times 10^5$ CFU/g |
| C + | $5 \times 10^4$ CFU/g |
| LN4750 | $5 \times 10^5$ CFU/g |
| FE + | $5 \times 10^4$ CFU/g |
| LN1391 | $5 \times 10^5$ CFU/g |
| FE + | $5 \times 10^4$ CFU/g |
| LN4637 | $5 \times 10^5$ CFU/g |
| FE + | $5 \times 10^4$ CFU/g |
| LN4750 | $5 \times 10^5$ CFU/g |

Results and Discussion

As seen in previous trials, homofermentative inoculants B and C were not effective in improving aerobic stability. Although the decrease in aerobic stability was minor when compared to uninoculated control, the decrease was greater than 24 hours in greater than 75% of the trials (Table 6).

TABLE 6

Treatment Consistency of WPCS Fall Field Trial Combination Prototypes

| Treatment | Win[1] | Loss[2] | No Effect |
|---|---|---|---|
| B | 2 | 6 | 0 |
| C | 0 | 5 | 3 |
| PROP | 3 | 2 | 3 |
| F + C21 | 1 | 1 | 6 |
| FE + C21 | 0 | 1 | 7 |
| B + C21 | 1 | 1 | 6 |
| C + 1391 | 6 | 0 | 2 |
| C + 4637 | 6 | 0 | 2 |
| C + 4750 | 7 | 0 | 1 |
| FE + LN1391 | 5 | 0 | 3 |
| FE + LN4637 | 6 | 0 | 2 |
| FE + LN4750 | 4 | 0 | 4 |

[1]24 hour increase in stability compared to control
[2]24 hour decrease in stability compared to control Combinations of FE or C with any of the three *L. buchneri* strains were effective in improving aerobic stability when averaged over eight trials while the combination of the homofermentative inoculants with the *L. brevis* were ineffective. The average improvement of the *L. buchneri* combinations was 48 hr when combined with C and approximately 35 hr when combined with FE. The most consistent treatment combination containing *L. buchneri* was C+LN4750 with a success rate of nearly 88% over the 8 trials.

There appeared to be no difference in fermentation when the homofermentative inoculants were combined with the *L. buchneri* as suggested by the terminal pH obtained after fermentation. Lactic acid levels were similar in silage treated either with C or C plus *L. buchneri*. The levels of acetic acid are elevated in the treatments containing *L. buchneri*, nearly twice that of the base inoculant. Because of this elevation, the lactic/acetic ratio was lower in the inoculant treatments containing the *L. buchneri*. This result is not surprising, as previous research has shown that one possible mechanism for increased aerobic stability after treatment with *L. buchneri* is the increase in acetic acid.

EXAMPLE 3

The purpose of this study was to compare the effects of B Corn Silage Inoculant to; B+*Lactobacillus buchneri* (LN4750), and D+*Lactobacillus buchneri* (LN4750) as measured by aerobic stability and steer performance.

Treatments (Soluble)

Control
B at $1 \times 10^5$ cfu/g of forage
B at $1 \times 10^4$ cfu/g of forage+LN4750 at $1 \times 10^5$ cfu/g of forage
D at $1 \times 10^5$ cfu/g of forage+LN4750 at $1 \times 10^5$ cfu/g of forage Procedure Whole plant corn forage (Pioneer 3335) harvesting was initiated Sep. 7, 1999 and was completed Sep. 9, 1999. The corn was harvested at approximately 2/3 milk line. A John Deere 3950 two-row pull-type forage chopper was used to harvest the forage. Silos were filled a set (one silo from each treatment) at a time. The theoretical chop length was 3/8 to 1/2 of an inch. Fifteen 2-ton silos were assigned to each treatment. The corn forage was processed before ensiling by running the forage through a stationary processor. The treatments were Control, B, B+*Lactobacillus buchneri* (LN4750), and D+*Lactobacillus buchneri* (LN4750). The treatments were applied in the soluble form to the forage as the forage was dropped into the silo by conveyor. The silos were packed by having a person walk over the top of the forage as it was loaded into the silo. One silo, from each treatment, was filled from every wagonload of forage as it was harvested. The filling order was alternated for every set of silos filled. The amount of forage placed in each silo was recorded. Samples of forage were taken as each silo was filled. The silos were sealed with a layer of plastic and plywood lid weighted with a 500 lb concrete weight. Samples were taken from each silo as it was fed out for the steer performance study. Samples from each silo were evaluated for aerobic stability. Aerobic stability was determined by putting a measured quantity of silage into a plastic container, the container was placed into a polystyrene cooler, the cooler into a temperature controlled room, a temperature probe was placed into the center of the silage mass, measuring temperature every three hours for one week (Honig, Das Wirtschaftseigene Futter (1975) 21:25–32).

Twenty head of Angus steers, averaging approximately 628 lb, were allotted by weight to each treatment for a feeding study. The study started Dec. 29, 1999. The cattle were fed for 63 days. The cattle were shrunk and weighed over a two-day period; at the start (day–1 and 0) and end of the study (day 62 and 63). The cattle were shrunk by cutting feed 50% and removing water for 16 hours each day. The ration was 88% WPCS and 12% supplement (42% protein soybean meal) on a DM basis. The steers were fed twice daily via Calan gates. The Calan Gate System allows for the feeding of animals on an individual basis by allowing an animal to have access only to their assigned feeding stall. Four steers were assigned to each pen. The animals were given access to fresh water and salt/mineral blocks at all times. The quantities fed were recorded. Refusals were collected, weighed and composited if needed. The performance data has been placed in Table 7.

TABLE 7

Animal performance

| Item[1] | Control | B | B + LN | D + LN |
|---|---|---|---|---|
| Number of animals | 19 | 20 | 20 | 20 |
| Days on test | 63 | 63 | 63 | 63 |
| Initial wt, lb | 631.5 | 627.7 | 627.1 | 627.2 |
| Final wt, lb | 804.3 | 798.4 | 806.4 | 805.7 |

TABLE 7-continued

| | Animal performance | | | |
|---|---|---|---|---|
| Item[1] | Control | B | B + LN | D + LN |
| Average daily gain, lb | 2.74 | 2.71 | 2.85 | 2.83 |
| Feed efficiency | 6.17 | 5.92 | 5.83 | 5.80 |
| Dry matter intake, lb | 16.15 | 15.86 | 16.44 | 16.15 |
| WPCS dry matter, % | 38.31 | 38.83 | 38.41 | 38.01 |
| Composition of diet | | | | |
| WPCS, DM % | 88.0 | 88.0 | 88.0 | 88.0 |
| Supplement, DM % | 12.0 | 12.0 | 12.0 | 12.0 |
| Dry matter recovery, % | 92.9[a] | 94.5[b] | 93.9[ab] | 94.2[b] |
| Gain/ton of WPCS fed, lb | 146.5 | 150.9 | 151.4 | 153.0 |
| Gain/ton of forage ensiled, lb | 136.0 | 142.5 | 142.2 | 144.1 |

[1]Values expressed as least squares means.
[a,b]Means within a row with different superscripts differ (P ≤ .05)

Conclusion

Fermentation differences were observed in the whole plant corn silage (WPCS). The D+*L. buchneri* treatment had lower (P≤0.05) lactic acid levels compared to the other treatments. The D+*L. buchneri* and B+*L. buchneri* treatments had higher (P≤0.05) acetic acid levels compared to the other treatments. No differences (P≤0.05) in performance were observed between treatments, however, the D+*L. buchnen* and B+*L. buchneri* treatments had a 3.6% increase in gain and a 5.5% improvement in efficiency over steers fed control WPCS. Dry matter recovery (DMR) for the B and D +*L. buchneri* treatments were better (P≤0.05) compared to the control. Aerobic stability, as measured by ROT and calculated DM loss were improved (P≤0.05) by the addition of *L buchneri* to both B and D. ROT was 26 and 23 hours better than control, for the combination treatments, respectively. DM loss was 1.38% and 0.97% less than control for the combination treatments, respectively.

The above examples are provided to illustrate the invention but not to limit its scope. Other variants of the invention will be readily apparent to one of ordinary skill in the art and are encompassed by the appended claims. All publications, patents, patent applications, and computer programs cited herein are hereby incorporated by reference.

What is claimed is:

1. A silage inoculant, comprising viable cultures of a homofermentive lactic acid bacteria and a heterofermentive lactic acid bacteria, wherein the homofermentive lactic acid bacteria are isolated and pure *Lactobacillus plantarum* and the heterofermentive lactic acid bacteria are isolated and pure *Lactobacillus buchneri* or *Lactobacillus brevis*, and wherein the ratio of viable cells of the homofermentive lactic acid bacteria to the heterofermentive lactic acid bacteria ranges from about 1:5 to about 1:15.

2. The silage inoculant of claim 1, wherein the ratio is about 1:8 to about 1:12.

3. The silage inoculant of claim 1, wherein said ratio is about 1:10.

4. The silage inoculant of claim 1, wherein the heterofermentive lactic acid bacteria is *Lactobacillus buchneri*.

5. The silage inoculant of claim 1, further comprising a viable culture of *Enterococcus faecium*.

6. The silage inoculant of claim 1, wherein said *Lactobacillus plantanun* is at least one of: LP286 (ATCC Accession No. 53187), LP287 (ATCC Accession No. 55058), LP329 (ATCC Accession No. 55942), LP346 (ATCC Accession No. 55943), LP347 (ATCC Accession No. 55944), or a functional mutant thereof.

7. The silage inoculant of claim 5, wherein said *Enterococcus faecium* is EF301 (ATCC Accession No. (55593), EF202 (ATCC Accession No. 53519), or a functional mutant thereof.

8. The silage inoculant of claim 3, wherein the heterofermentive lactic acid bacteria is *Lactobacillus buchneri*.

9. The silage inoculant of claim 8, wherein the heterofermentive lactic acid bacteria is LN1391 (ATCC Accession No. PTA-2493), LN4637 (ATCC Accession No. PTA-2494), LN4750 (ATCC Accession No. PTA-2495), or a functional mutant thereof.

10. The silage inoculant of claim 1, further comprising a carrier suitable for application to silage.

11. The silage inoculant of claim 1, wherein at least two strains of the homofermentive lactic acid bacteria are present in said inoculant.

12. The silage inoculant of claim 11, wherein the at least two strains of homofermentive lactic acid bacteria are at least two of LP286 (ATCC Accession No. 53187), LP287 (ATCC Accession No. 55058), LP346 (ATCC Accession No. 55943), LP347 (ATCC Accession No. 55944), LP329 (ATCC Accession No. 55942), or a functional mutant thereof.

13. The silage inoculant of claim 12, wherein the heterofermentive lactic acid bacteria is *Lactobacillus buchneri*.

14. The silage inoculant of claim 13, wherein the strain of *Lactobacillus buchneri* is at least one of LN1391 (ATCC Accession No. PTA-2493), LN4637 (ATCC Accession No. PTA-2494), LN4750 (ATCC Accession No. PTA-2495), or functional mutant thereof.

15. The silage inoculant of claim 14, further comprising at least one strain of *Enterococcus faecium* selected from the group consisting of: EF301 (ATCC Accession No. (55593), EF202 (ATCC Accession No. 53519), and functional mutants thereof.

16. The silage inoculant of claim 8, wherein at least two strains of homofermentive lactic acid bacteria are present in the inoculant.

17. An animal feed or silage comprising the silage inoculant of claim 1.

18. The animal feed or silage of claim 17, wherein the ratio is about 1:10 and the heterofermentive lactic acid bacteria is *Lactobacillus buchneri*.

19. The animal feed or silage of claim 17, comprising an isolated and purified combination of a viable culture of:
   (a) at least two of: LP286 (ATCC Accession No. 53187), LP287 (ATCC Accession NQ. 55058), LP346 (ATCC Accession No. 55943), LP347 (ATCC Accession No. 55944), LP329 (ATCC Accession No. 55942), or a functional mutant thereof; and
   (b) at least one of: LN1391 (ATCC Accession No. PTA-2493), LN4637 (ATCC Accession No. PTA-2494), LN4750 (ATCC Accession No. PTA-2495), or a functional mutant thereof;
   wherein the ratio of viable cells of (a) to (b) ranges from about 1:5 to about 1:15.

20. The animal feed or silage of claim 18, wherein the feed is whole plant corn silage or high moisture corn.

21. A method of treating animal feed or silage, comprising administering the silage inoculant of claim 7 to the feed or silage at about $1 \times 10^4$ to $1 \times 10^5$ CFU/g of feed or silage.

22. The method of claim 21, wherein the feed or silage is whole plant corn silage or high moisture corn.

23. A method of improving animal performance, comprising feeding the animal the animal feed of claim 18.

24. A container comprising the silage inoculant of claim 8 and a carrier.

25. The container of claim 24 comprising at least 50 grams of inoculant and carrier.

* * * * *